(12) United States Patent
Eddy

(10) Patent No.: US 7,571,182 B1
(45) Date of Patent: Aug. 4, 2009

(54) EMULATION OF A BALANCED HIERARCHY FROM A NONBALANCED HIERARCHY

(75) Inventor: Quinlan K. Eddy, Issaquah, WA (US)

(73) Assignee: Star Analytics, Inc., San Mateo, CA (US)

(*) Notice: Subject to any disclaimer, the term of this patent is extended or adjusted under 35 U.S.C. 154(b) by 325 days.

(21) Appl. No.: 11/043,771

(22) Filed: Jan. 26, 2005

(51) Int. Cl.
  *G06F 17/30* (2006.01)
  *G06F 7/00* (2006.01)
(52) U.S. Cl. .................... 707/102; 707/101; 707/204
(58) Field of Classification Search ............. 707/102, 707/101, 204
  See application file for complete search history.

(56) References Cited

U.S. PATENT DOCUMENTS

| | | | |
|---|---|---|---|
| 5,943,668 | A | 8/1999 | Malloy et al. |
| 6,122,636 | A | 9/2000 | Malloy et al. |
| 6,381,600 | B1 | 4/2002 | Lau |
| 6,675,173 | B1* | 1/2004 | Shadmon ................. 707/102 |
| 6,768,986 | B2 | 7/2004 | Cras et al. |
| 2003/0236948 | A1* | 12/2003 | Erdner et al. ............. 711/134 |
| 2005/0075949 | A1* | 4/2005 | Uhrig et al. ............... 705/28 |

OTHER PUBLICATIONS

Karayannidis: "Storage Structures, Query Processing and Implementation On-Line Analytical Processing Systems", Ph. D. Thesis, National Technical University of Athens, Apr. 2003.*

* cited by examiner

*Primary Examiner*—Kuen S Lu
(74) *Attorney, Agent, or Firm*—Michael Plotnick

(57) ABSTRACT

A computer based method and system is described for transforming a portion of a multidimensional database to a form compatible with a relational database management system, where the portion of the multidimensional database has one or more nonbalanced (unbalanced, ragged, etc.) dimension hierarchies. The method comprises receiving a dimension identifier that identifies a portion of a multidimensional database, traversing the branches of the tree structured hierarchy and calculating the depth of each leaf-level dimension member to determine the maximum depth in the dimension, exporting rows from the received portion of the multidimensional database into a data transfer file comprising a plurality of rows, and inserting an element into each position in the exported rows, wherein at least one element is repeated to fill unpopulated positions. In an alternate embodiment, a sequence of database insertion instructions is created in place of the data transfer file.

13 Claims, 9 Drawing Sheets

FIG. 5A

| | GEN 1 | GEN 2 | GEN 3 | GEN 4 | GEN 5 |
|---|---|---|---|---|---|
| 512 | | | | | |
| 514 | CEO | EXECUTIVE ASSISTANT | 518 | 520 | 522 |
| 516 | CEO | SENIOR VICE PRESIDENT | DIRECTOR | MANAGER | ASSOCIATE |

| | ROOT | CONTINENT | COMMUNITY | COUNTRY | STATE | CITY |
|---|---|---|---|---|---|---|
| 544 | | | | | | |
| 546 | WORLD | NORTH AMERICA | 552 | USA | CALIFORNIA | SAN FRANCISCO |
| 548 | WORLD | EUROPE | EUROPEAN COMMUNITY | 558 | 554 | PARIS |
| 550 | WORLD | EUROPE | EUROPEAN COMMUNITY | 556 | 559 | VATICAN CITY |

| | GEN 1 | GEN 2 | GEN 3 | GEN 4 | GEN 5 |
|---|---|---|---|---|---|
| 572 | | | | | |
| 574 | WORLD | NORTH AMERICA | USA | CALIFORNIA | SAN FRANCISCO |
| 576 | WORLD | EUROPE | EUROPEAN COMMUNITY | FRANCE | PARIS |
| 578 | WORLD | EUROPE | VATICAN CITY | 580 | 582 |

| | GEN 1 | GEN 2 | GEN 3 | GEN 4 | GEN 5 |
|---|---|---|---|---|---|
| 712 | CEO | EXECUTIVE ASSISTANT | EXECUTIVE ASSISTANT | EXECUTIVE ASSISTANT | EXECUTIVE ASSISTANT |
| 714 | | | | | |
| 716 | CEO | SENIOR VICE PRESIDENT | DIRECTOR | MANAGER | ASSOCIATE |

| | GEN 1 | GEN 2 | GEN 3 | GEN 4 | GEN 5 | GEN 6 |
|---|---|---|---|---|---|---|
| 744 | WORLD | NORTH AMERICA | USA | CALIFORNIA | SAN FRANCISCO | SAN FRANCISCO |
| 746 | | | | | | |
| 748 | WORLD | EUROPE | EUROPEAN COMMUNITY | FRANCE | PARIS | PARIS |
| 750 | WORLD | EUROPE | VATICAN CITY | VATICAN CITY | VATICAN CITY | VATICAN CITY |

(732, 734, 736, 738, 740, 742)

EMULATION OF A BALANCED HIERARCHY FROM A NONBALANCED HIERARCHY

TECHNICAL FIELD

This invention generally relates to database management systems and On-Line Analytical Processing (OLAP), and in particular, to the extraction of data and metadata from a multidimensional data model.

BACKGROUND

As the global business climate becomes ever more competitive, survival in the marketplace requires timely and precise business decisions based on accurate and up-to-date information. Data analysis, reporting, and database query software provide business users with the tools to plow through the ever-growing mountain of data. Business intelligence (BI) is the name given to the broad category of applications and technologies for helping business users make better decisions. BI applications include decision support systems, query and reporting, online analytical processing (OLAP), statistical analysis, forecasting, and data mining. For decision support and OLAP applications, multidimensional databases are generally superior to traditional relational database management systems in terms of speed, size, and manageability. Specifically, multidimensional databases offer improvements in calculation performance, trend analysis/modeling, business modeling capabilities, and the management of sparse data sets. The structure of a multidimensional database is superior to a relational database for these applications because the sophisticated aggregation paths, calculations, and write-back capabilities can help model, more effectively, the business entities and relationships among entities that make up a company's operations. For example, companies usually organize products by lines or families, customers by regions or distribution channels, and employees by divisions and regions. Analysts use these structures to navigate in an intuitive manner.

Users of sophisticated BI systems may wish to extract data from one database, perform transformations of this data, and load the transformed data into another database. This process (referred to as "ETL"—Extraction, Transformation, and Loading) allows for the consolidation of data into a centralized data warehouse. This consolidated data may be used with one of the many database analysis, data mining, reporting and visualization tools. ETL is commonly used with a source database optimized for Online Transaction Processing (OLTP) and a destination database that is optimized to support analysis and reporting (e.g. star schema model or data warehouse). A data warehouse stores historical data and it is typically used as a read-only database for analysis and reporting. For example, data may be extracted from a data warehouse to load an OLAP model. During analysis, new data may be generated in OLAP systems based on historical data that was loaded into it. As a result, this calculated data exists only in the OLAP system and not in the original data warehouse. While it is known in the art to report on or extract a subset of data from an OLAP system for reporting, no simple method has been developed to extract data from an OLAP system for the purpose of loading it back into a data warehouse/relational system (which is typically a company's preferred historical record store).

There is a need for a method of extraction and transformation from a multidimensional model, and that can systematically load a variety of hierarchical structures in a relational model.

SUMMARY

Users wishing to employ relational database reporting, analysis, and visualization tools with data originating from a multidimensional database require that the data and metadata (the descriptive information about the data contained in the database) be extracted and transformed to a format that is compatible with the relational database. In order to import data into a relational database from a dimensional hierarchy in a multidimensional database, the dimensional hierarchy must either be transformed into a table-based (group of flat files) format, or a series of relational database insertion instructions/commands. To conform to the import requirements of the relational database management system, this transformation process typically requires that the load files or insertion instructions represent balanced hierarchies.

The presence of unpopulated cells in the load files or insertion instructions (indicative of nonbalanced hierarchies) creates compatibility problems when transferring dimensionally-structured metadata between multidimensional databases and relational database management systems.

In one embodiment, a computer executed method is performed to transform a nonbalanced hierarchy into a balanced hierarchy model, where the balanced model is defined using a generation format. In this embodiment, a hierarchy from a multidimensional database may be first traversed to determine the maximum depth, or number of generations/levels, of its dimension members. After determining the maximum depth, a generation format file may be created with each row having the maximum number of generations. Members are populated in each row without leaving unpopulated cells. If unpopulated cells remain at the end of a row, "virtual generations" may be created in the unpopulated cells. In one embodiment, the virtual generations are created by repeating the leaf-level cell into the unpopulated cells. In an alternate embodiment, a sequence of database insertion instructions is created in place of the data transfer file.

These and other features and objects of the invention will be more fully understood from the following detailed description of the embodiments which should be read in light of the accompanying drawings.

In this respect, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 5A illustrates an exemplary generation-based file format of an unbalanced employee hierarchy;

FIG. 5B illustrates an exemplary logical hierarchy-based file format of a ragged geography hierarchy;

FIG. 5C illustrates an exemplary generation-based file format of a ragged geography hierarchy;

FIG. 7A illustrates an exemplary transformed generation-based file format of an unbalanced employee hierarchy;

FIG. 7B illustrates an exemplary transformed generation-based file format of a ragged geography hierarchy;

DETAILED DESCRIPTION

Figure 1:
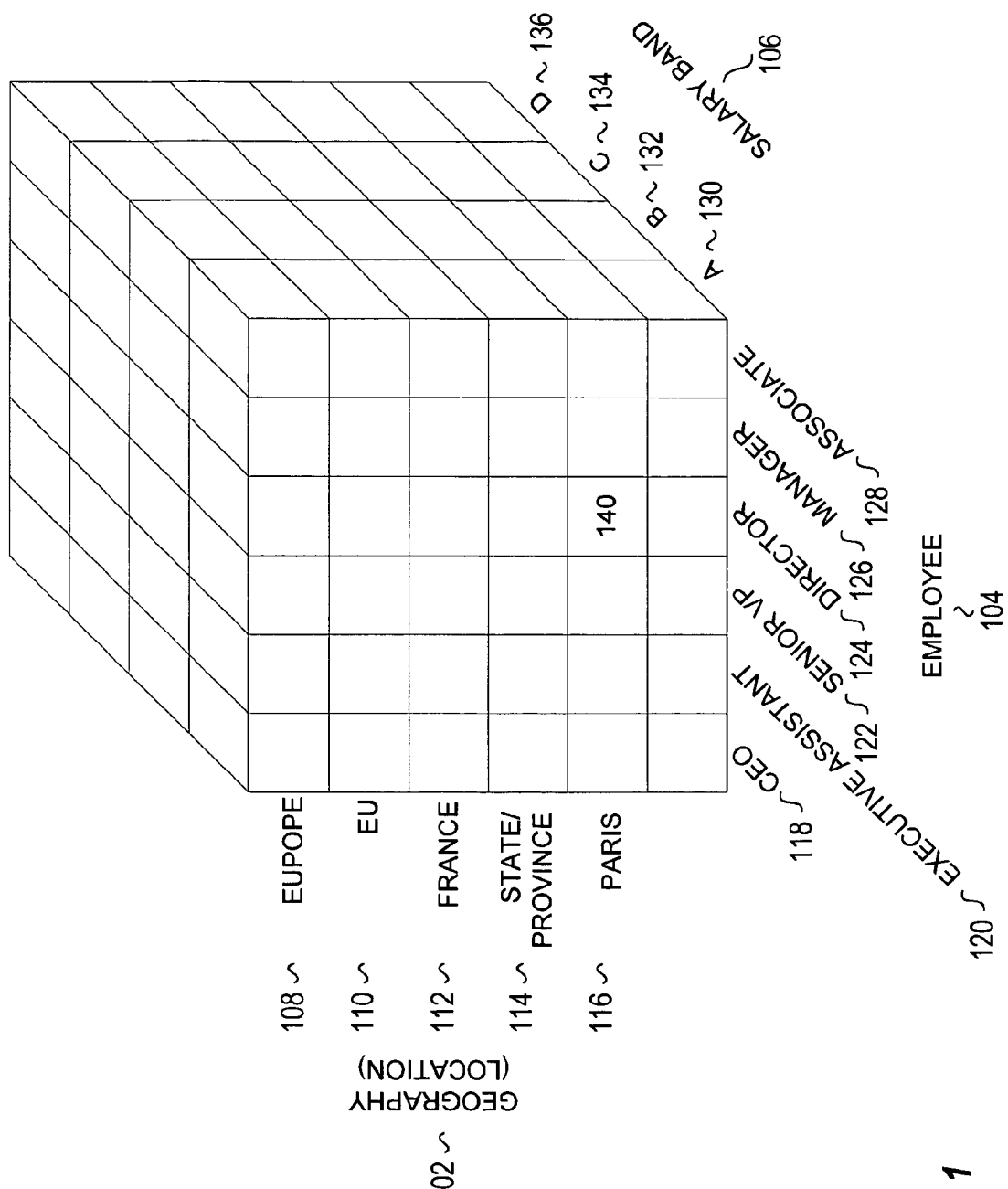
FIG. 1 illustrates a simple exemplary multidimensional cube.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

A multidimensional database is a database organized as cubes (or hypercubes) having a set of dimensions that provide an index to each data cell within the cube. In a multidimensional database, each dimension is formed by a tree structure of nodes called dimension members, or simply "members", which may be organized in a hierarchy or hierarchies of (summary) levels. Dimensions are, in many ways, analogous to Cartesian coordinates or basis vectors in mathematics in that a data point or cell may be referenced by selecting a member for each of the dimensions and using the "intersection" of the selected members to find/index data values. In a dimension hierarchy, each level of the hierarchy which is below a summary level may represent a degree of detail or granularity of the data. A hierarchy provides an intuitive way to consolidate, aggregate, calculate and navigate across the dimension. Typically, sets of members are grouped at each level of the hierarchy because of similar attributes.

FIG. 1 shows a simple exemplary multidimensional cube that may represent, for example, the salary ranges of employees in a multinational corporation. In this example, there are three dimensions shown. Although a three dimensional cube is used for this example because it is easily shown in a visual illustration, cubes of any dimension may be used. In FIG. 1, the three dimensions are geography (location) 102, employee 104, and salary band 106. The geography dimension 102 has five levels of hierarchy: the continent (Europe 108), the economic community (EU 110), the country (France 112), the state or province (empty in this example), and the city (Paris 114). The employee dimension 104 has five hierarchy levels: the CEO 118, the Executive Assistant 120, the Senior VP 122, the director 124, the manager 126, and the associate 128 (note that the Executive Assistant 120 and Senior VP 122 are at the same hierarchy level). The salary band dimension has one level with four elements: salary band A 130, salary band B 132, salary band C 134, and salary band D 136. Sample data element 140 contains information regarding a director 124 in the Paris location 114 in salary band A 130.

Figure 2:
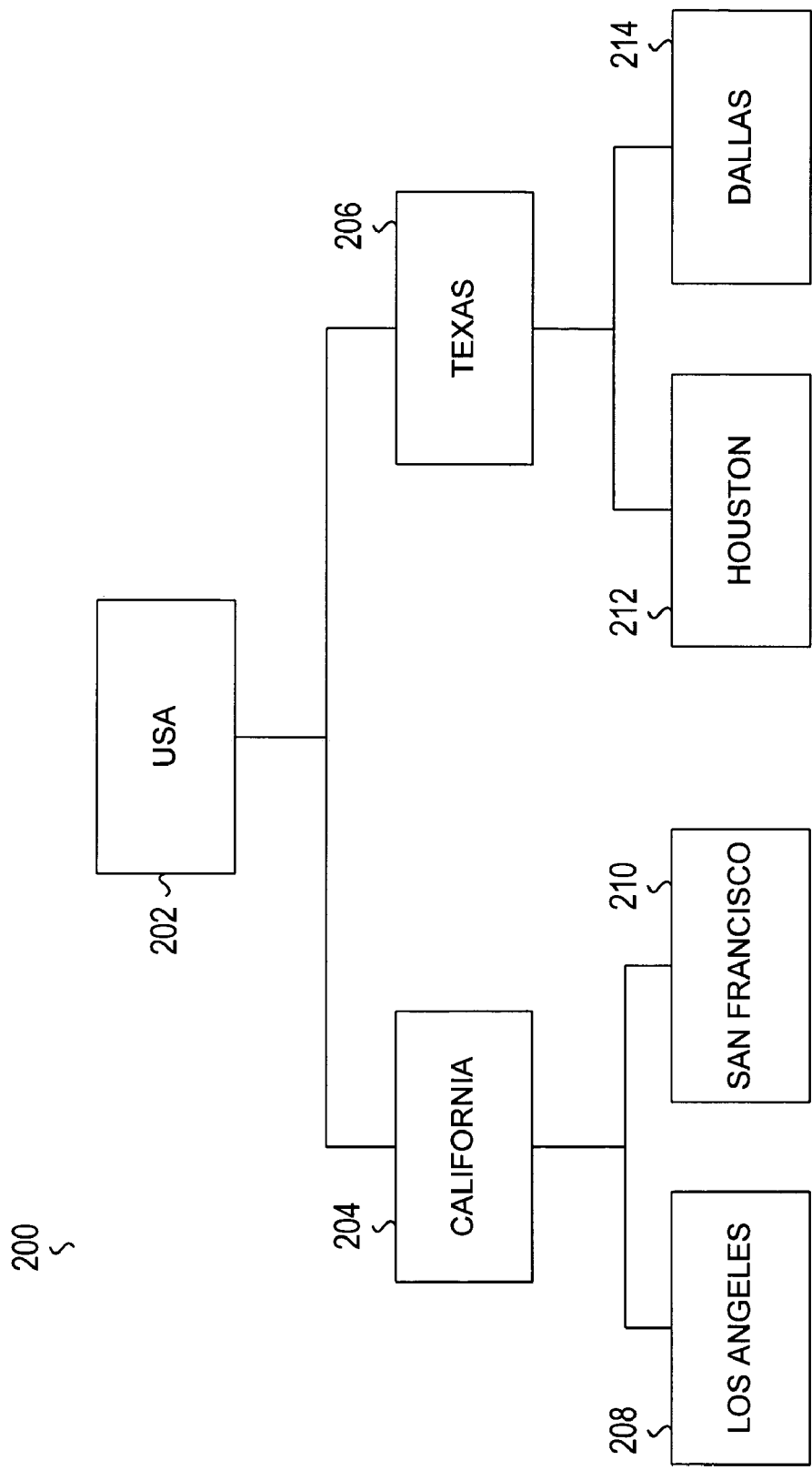
FIG. 2 illustrates an exemplary balanced hierarchy representing a geographical dimension.

Hierarchies store information about how the members in a dimension are related to each other. Members are structured above, at the same level, or below other members. FIG. 2 shows an example of how members in a hierarchy 200 might be structured. The single member at the top of the hierarchy can be referred to as the root (USA 202). The positions at the bottom of a hierarchy (illustrated in FIG. 2 as Los Angeles 208, San Francisco 210, Houston 212, and Dallas 214), where the member has no members below it, are called the "leaf-level" members (they can also be referred to as "leaf-node", or "level zero" members). The successive steps along a particular branch of a hierarchy are commonly described as "generations", when stepping from the root member to the members below. When stepping from the leaf-level upwards toward the root-level member, the steps are incremented with the leaf-level representing level zero and its parent is level 1. The relationship among the members shown in FIG. 2 is a container-like hierarchy, where each level is contained within the level above. For example, in FIG. 2, California 204 contains Los Angeles 208 and San Francisco 210, while Texas 206 contains Houston 212 and Dallas 214. The root member USA 202 contains California 204 and Texas 206, and, by extension, all of the leaf-level members. Other hierarchical relationships are also possible.

In a multidimensional cube model, each dimensional hierarchy can have multiple branching structures. In a balanced hierarchy, all branches have the same number of levels between the root and each leaf-level member—all leaf-level members of a dimension are at the same generation. FIG. 2 is an example of a balanced hierarchy.

Figure 3:
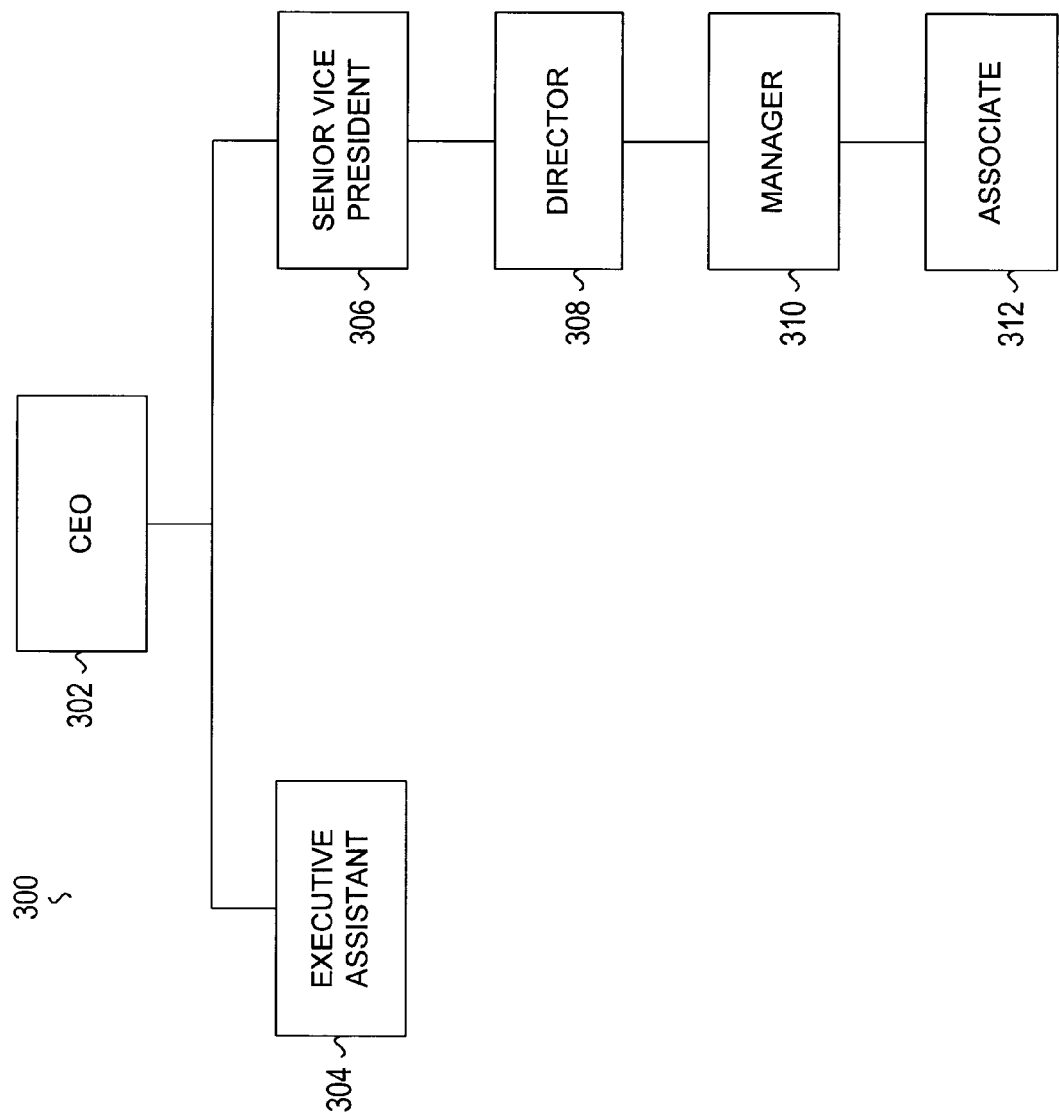
FIG. 3 illustrates an exemplary unbalanced hierarchy representing an employee dimension.

In practice, dimensions frequently require multiple hierarchies, and it is common for hierarchies not to be balanced and/or to have gaps in logical levels. In a nonbalanced hierarchy the branching structures are asymmetric or some branches have fewer levels than others. One type of nonbalanced hierarchy is referred to as an "unbalanced" hierarchy. In an unbalanced hierarchy, some branches have more levels between the root and leaf-level members than other branches. FIG. 3 illustrates one example of a simple unbalanced hierarchy. In this example, the hierarchy represents an employee dimension 300, with a supervisor/subordinate relationship, where the lower level members of the dimension are the subordinates and the higher level members are supervisors. In the hierarchy shown in FIG. 3, Executive Assistant 304 and Associate 312 are both leaf-level members of the employee dimension 300. However, the Executive Assistant 304 is two generations deep, whereas the Associate 312 is five generations deep. Note that all employees (except the root-member CEO 302) report to a supervisor, therefore the logical meaning between any employee and his direct superior is consistent (i.e., the parent to child relationship is "supervisor" to "subordinate", regardless of the depth of the generation).

Figure 4:
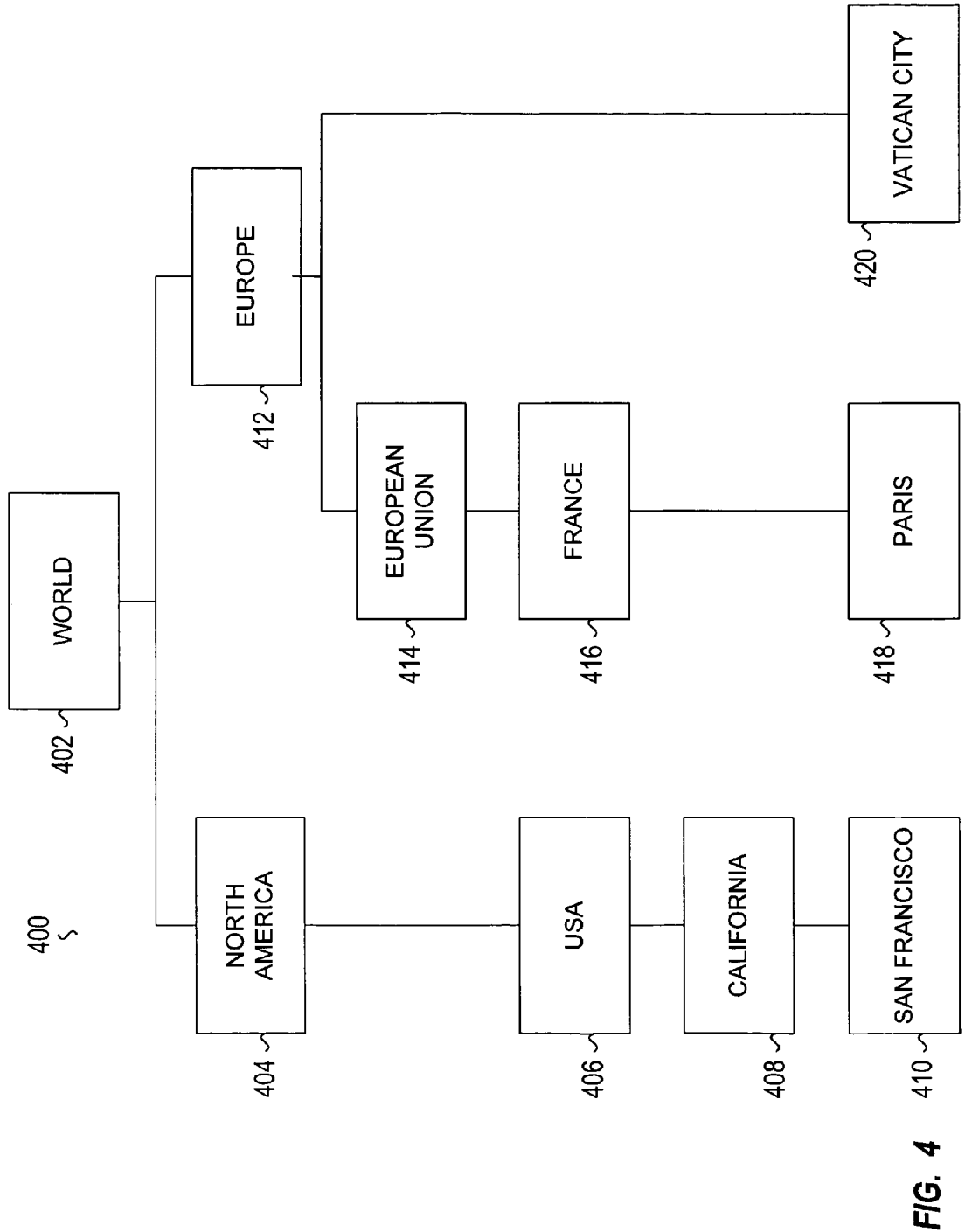
FIG. 4 illustrates an exemplary ragged hierarchy representing a geographical dimension.

Another type of nonbalanced hierarchy is called a "ragged" hierarchy. A ragged hierarchy includes at least one member whose parent is more than one logical level above itself. FIG. 4 illustrates an example of a ragged hierarchy, representing a geography dimension 400, where the lowest level members are cities (San Francisco 410, Paris 418, and Vatican City 420). A city may have a parent that is a state, but, in some cases, there is no state. For example, in FIG. 4, San Francisco 410 is a city in the state of California 408. In other branches of the hierarchy, this logical level may be skipped (there is no state equivalent) so that the city has a parent that is a country.

For example, in FIG. 4, Paris 418 is a city in France 416 (a country). The depth of the hierarchy's branches may vary in a ragged hierarchy because of structural differences within each of the branches. In the geography dimension 400 example, the levels in the various branches of the hierarchy represent regional differences. In FIG. 4, although both San Francisco 410 and Paris 418 are five generations deep, their logical parent levels are not symmetrical because the branch that includes San Francisco 410 has a state level, but no economic community level, whereas Paris 418 has no state level, but has an economic community level (European Union 414). Though it could be argued that Vatican City is a country rather than a city, it is three generations deep whereas the leaf-level members San Francisco and Paris are five generations deep.

Businesses typically manage their data warehouse using a relational database management systems. Many business intelligence reporting, analysis, and visualization applications are designed to extract data from this type of relational database. Relational database technology differs from multi-dimensional data stores. In a relational database, the data and relationships between data are organized into a plurality of related tables. Each table is a collection of records (usually represented as rows in the table) and each record contains a sequence of fields (usually represented as columns). SQL (Structured Query Language) is used to query and manage data in a relational database. Users wishing to employ relational database reporting, analysis, and visualization tools with data originating from an OLAP (multidimensional) database require that the data and metadata (the descriptive information about the data contained in the database) be extracted and transformed to a format that is compatible with the relational database. In order to import data into a relational database from a dimensional hierarchy in a multidimensional database, the dimensional hierarchy must either be transformed into a table-based format (group of flat files), or into a sequence of relational database insertion instructions/commands. To conform to the import requirements of the relational database management system, this transformation process typically requires that the load files or insertion instructions represent balanced hierarchies.

Transforming or mapping the hierarchical, dimensional metadata to a flat file format allows import (loading) of the metadata into corresponding relational database dimension tables. In an embodiment, to conform to the balanced hierarchy requirements of a relational database management system, this transformation process takes multidimensional database structures with unbalanced/ragged hierarchies (common in multidimensional databases) and emulates a symmetric hierarchy structure.

A generation-based file format for the unbalanced employee hierarchy shown in FIG. 3 is illustrated in FIG. 5A. Generation table 500 includes header row 512, which defines the generation of each of the columns in the flat file and branch rows 514 and 516, representing the two branches in the original hierarchy illustrated in FIG. 3. Unpopulated cells 518, 520, and 522 represent the missing generations, or levels, of this unbalanced hierarchy.

FIG. 5B illustrates a flat file format generated from the ragged geography hierarchy illustrated in FIG. 4. In geography level table 530, header row 544 shows the logical level for each column in the flat file, including the root 532, continent 534, economic community 536, country 538, state 540, and city 542. Rows 546, 548, and 550 describe the branch (hierarchy) sequence for each of the cities 542. Unpopulated cells 552, 554, 556, 558, and 559 represent the missing logical levels of this ragged hierarchy.

An alternative view of the ragged geography hierarchy illustrated in FIG. 4 is shown in FIG. 5C. In geography generation format 560, header row 572 defines the generation of each of the columns in the table and branch rows 574, 576, and 578 represent the three branches in the original hierarchy illustrated in FIG. 4. This representation still has unpopulated cells 580 and 582, representing missing levels of the original ragged hierarchy.

The presence of unpopulated cells in the files illustrated in FIG. 5A, FIG. 5B, and FIG. 5C may create compatibility problems when replicating dimensionally-structured metadata between multidimensional databases and alternative database technologies such as relational database management systems, as most relational models require that dimension hierarchies are balanced, i.e., generations and levels are symmetric across the branches of the dimension.

In one embodiment, a computer executed method is performed to transform a nonbalanced hierarchy into a balanced hierarchy model, where the balanced model is defined using a generation format. In this embodiment, a multidimensional hierarchy may be first traversed to determine the maximum depth ($D_m$), or number of generations/levels, of its dimension members. After determining the maximum depth, a generation format file may be created with each row having $D_m$ generations. Members are populated in each row without leaving unpopulated cells. If unpopulated cells remain at the end of a row, "virtual generations" may be created in the unpopulated cells. In an embodiment, the virtual generations are created by repeating the leaf-level cell into the unpopulated cells. In another embodiment, a cell other than the leaf-level cell may be repeated to fill unpopulated cells.

Figure 6:
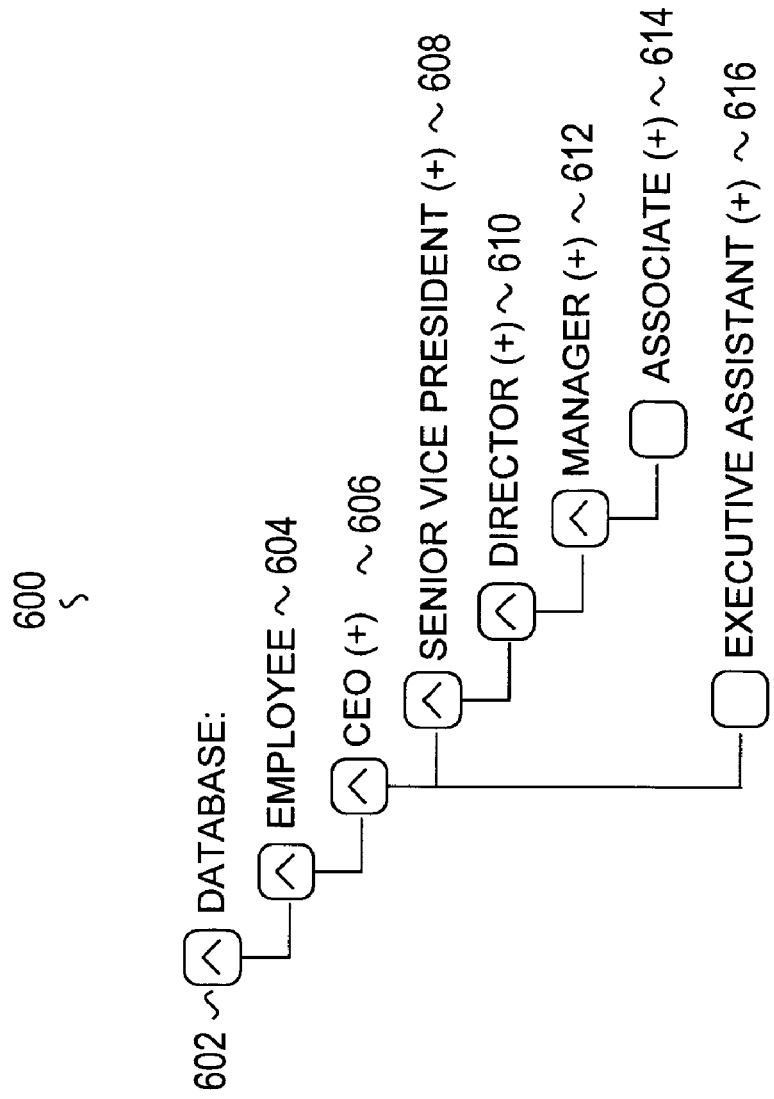
FIG. 6 illustrates how the employee hierarchy would appear in a Hyperion Essbase® outline.

FIG. 6 shows a Hyperion Essbase® "outline", which contains the tree structured hierarchy of the employee dimension shown in FIG. 3. Each branch of a given dimension could be traversed, one member at a time, to calculate the maximum generation depth (i.e., the depth from the root element) for the members of any dimension. In FIG. 6, the maximum depth of the employee dimension 604 is five. This is because, starting with CEO 606 as generation 1, the associate 614 is generation 5. The other leaf-level member in the employee dimension is executive assistant 616, which is positioned in generation 2.

In an embodiment, a "balanced" export file format, based on the employee dimension of FIG. 3 and FIG. 6 would appear as illustrated in FIG. 7A. Similarly, a "balanced" export file format, based on the geography dimension of FIG. 4 would appear as illustrated in FIG. 7B. In FIG. 7A, employee dimension 700 includes header row 712 defining generations one through five as columns 702, 704, 706, 708, and 710 respectively. The two branches of the employee dimension 700 are represented in rows 714 and 716. As illustrated, branch row 714 includes repeated instances of "Executive Assistant" to fill the otherwise unoccupied cells in columns 706, 708, and 710. In FIG. 7B, geography dimension 730 includes header row 744 defining generations one through six as columns 732, 734, 736, 738, 740, and 742 respectively. The three branches of the geography dimension 730 are represented in rows 746, 748, and 750. As illustrated, branch row 746 includes a repeated instance of "San Francisco" to fill the otherwise unoccupied cell in column 742, branch row 748 includes a repeated instance of "Paris" to fill the otherwise unoccupied cell in column 742, and branch row 750 includes repeated instances of "Vatican City" to fill the otherwise unoccupied cells in columns 738, 740, and 742.

In an embodiment, the method further comprises the mapping of generations in the text file to the appropriate column names to correspond to the relational database management system target table. The method allows input parameters to be specified by end-users or application administrators which will serve as labels, or column headings, for the generation columns in the file. The methodology also allows users the option to suppress generations/levels from exportation, which gives users control over the maximum number of columns in the export file.

Figure 8:
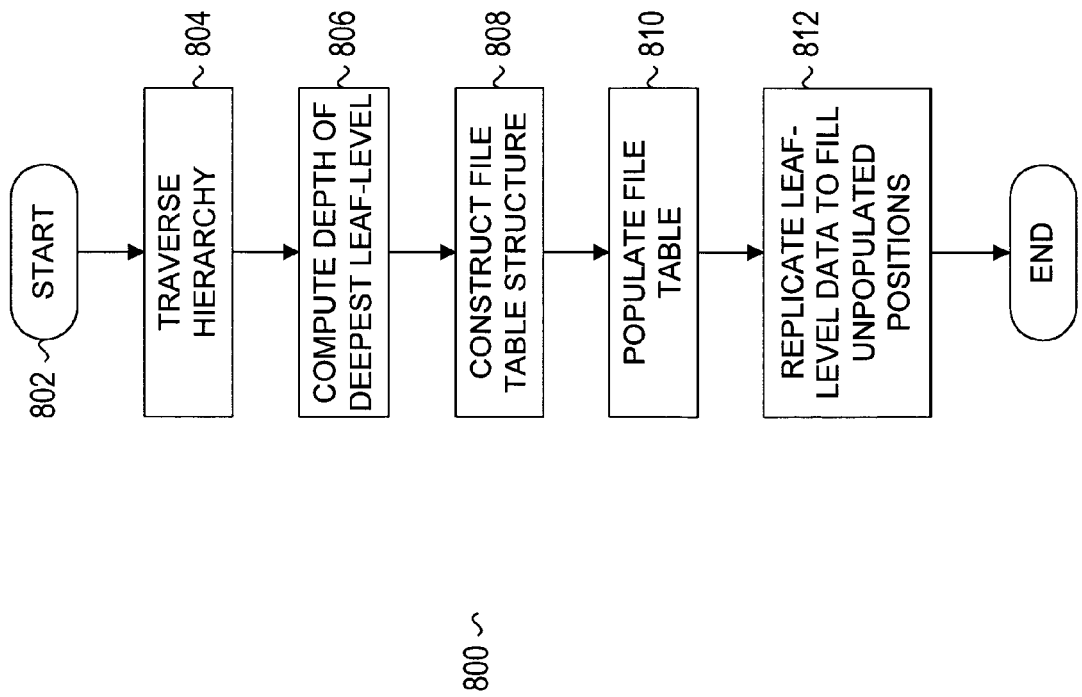
FIG. 8 illustrates a simplified exemplary software flow diagram of an embodiment of a method of transforming multidimensional hierarchies to a flat file.

FIG. 8 illustrates a simplified exemplary software flow diagram of an embodiment of a method of transforming multidimensional hierarchies to a flat file while creating balanced hierarchies from nonbalanced hierarchies. After the process start 802, the specified hierarchy is traversed 804. The traverse hierarchy step 804 walks the entire hierarchical structure, touching each element in the hierarchy and identifying the generation or level of each member of the hierarchical structure. Algorithms for traversing tree structures are well known in the art. Once the entire hierarchy is traversed, the depth of the deepest leaf-level member ($D_m$) may be computed 806. This computation may be done, in one embodiment, by determining the leaf-level member with the highest generation number. Having computed the maximum generation number, the structure of the export file may be constructed 808. In this step, an export file may be created with a row for each of the leaf-level members of the hierarchy, with each row having $D_m$ positions (columns). The target relational table structure is then populated 810 with metadata extracted from the multidimensional database. The population of cells in the table is carried out from the first generation, ensuring that each cell is populated until no generations remain in the imported branch. With an unbalanced or ragged hierarchy, this process will leave some unpopulated cells at the end of some rows of the table (as illustrated in FIG. 5A and FIG. 5C). The final step in the transformation process 812 is to copy (replicate) the leaf-level metadata, in each row where there are unpopulated cells, to the unpopulated cells in the same row. The resultant table has each cell populated, as illustrated in FIG. 7A and FIG. 7B. In an alternate embodiment, cells other that the leaf-level cell are replicated to fill unpopulated cells.

In another embodiment, a sequence of programmatic commands or instructions are created that may be used to directly insert the extracted metadata into the target database, including the step of replicating a member to fill unpopulated locations in a dimension hierarchy. In this embodiment, instead of creating an intermediate flat file table, a sequence of instructions is created (in, for example, SQL, Java, C, C++, or another computer programming language) that directly loads the extracted metadata into the target database management system.

Figure 9:
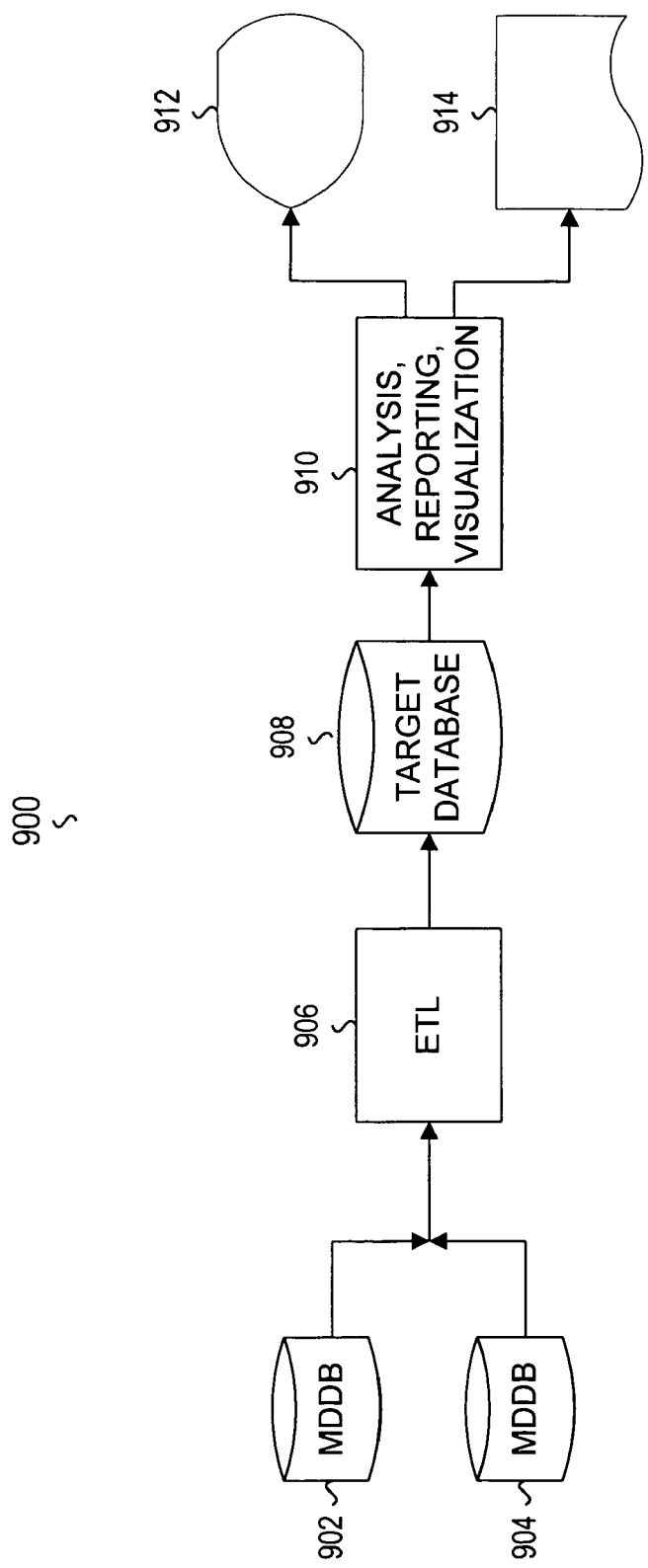
FIG. 9 illustrates how an embodiment of the described method fits into an application environment.

FIG. 9 illustrates how an embodiment of the described method fits into an application environment 900. In application environment 900, ETL system 906 extracts data and metadata from one or more source databases (902 and 904). Although two multidimensional databases are illustrated on FIG. 9, any number of source databases may be used. ETL system 906 includes an embodiment of the methods described above for extracting data from one or more multidimensional databases and transforming the multidimensional database information into files that are compatible with, and may be loaded into, a target database 908. Although a single target database is illustrated in FIG. 9, one skilled in the art will recognize that ETL system 906 may load transformed files into any number of database systems. In an embodiment, target database is a relational database management system. In an alternate embodiment, the target database is multidimensional. Once loaded into target database 908, the transformed data may be used by analysis, reporting, and visualization system 910 to produce a user display 912 and/or user reports 914.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computer based method for transforming a nonrelational multidimensional database, the method comprising:
    receiving a dimension identifier that identifies a portion of the nonrelational multidimensional database comprising a nonbalanced tree structured dimension hierarchy with at least two branches, wherein each branch comprises at least a leaf-level dimension member;
    traversing the branches of the dimension hierarchy and calculating the depth of each leaf-level dimension member to determine the maximum depth ($D_m$) in the dimension hierarchy; and
    exporting one or more dimension members from the dimension hierarchy into a data transfer file comprising a plurality of rows, wherein each row comprises Dm positions, wherein the exporting comprises, for each row in the data transfer file:
        inserting the dimension members from a branch of the dimension hierarchy into successive positions in the row; and
        if unpopulated positions remain in the row, repeating at least one dimension member to fill the unpopulated positions in the row, wherein the repeated dimension member is the leaf-level dimension member.

2. The computer based method of claim 1, wherein the nonbalanced tree structured dimension hierarchy is an unbalanced hierarchy.

3. The computer based method of claim 1, wherein the nonbalanced tree structured dimension hierarchy is a ragged hierarchy.

4. The computer based method of claim 1, wherein the data transfer file is formatted such that the rows of the data transfer file are in a human-readable form.

5. The computer based method of claim 1, wherein the data transfer file is formatted such that the rows of the data transfer file are in a computer-readable form.

6. The computer based method of claim 1, wherein the step of exporting also comprises suppressing dimension members from exportation, thereby reducing the depth of the hierarchy from its original structure in the nonrelational multidimensional database.

7. The computer based method of claim 1, additionally comprising:
    loading the data transfer file into a relational database management system.

8. A computer readable medium having a computer program stored thereon for transforming a nonrelational multidimensional database, wherein the program comprises:

a code segment for receiving a dimension identifier that identifies a portion of the nonrelational multidimensional database comprising a nonbalanced tree structured dimension hierarchy with at least two branches, wherein each branch comprises at least a leaf-level dimension member;

a code segment for traversing the branches of the dimension hierarchy and calculating the depth of each leaf-level dimension member to determine the maximum depth (Dm) in the dimension hierarchy; and a code segment for exporting one or more dimension members from the dimension hierarchy into a data transfer file comprising a plurality of rows, wherein each row comprises Dm positions, wherein the code segment for exporting comprises:

a code segment for inserting the dimension members from a branch of the dimension hierarchy into successive positions in a row of the data transfer file; and a code segment for repeating, if unpopulated positions remain in the row, at least one dimension member to fill the unpopulated positions in the row, wherein the repeated dimension member is the leaf-level dimension member.

9. The computer program of claim 8, additionally comprising:

a code segment for loading the data transfer file into a relational database management system.

10. A database system comprising:

a data transfer file, and a computer processing unit for:

receiving a dimension identifier that identifies a portion of a nonrelational multidimensional database comprising a nonbalanced tree structured dimension hierarchy with at least two branches, wherein each branch comprises at least a leaf-level dimension member; traversing the branches of the dimension hierarchy and calculating the depth of each leaf-level dimension member to determine the maximum depth (Din) in the dimension hierarchy; and exporting one or more dimension members from the dimension hierarchy into a data transfer file comprising a plurality of rows, wherein each row comprises Dm positions, wherein the exporting comprises, for each row in the data transfer file:

inserting the dimension members from a branch of the dimension hierarchy into successive positions in the row; and if unpopulated positions remain in the row, repeating at least one dimension member to fill the unpopulated positions in the row, wherein the repeated dimension member is the leaf-level dimension member; and loading the data transfer file into a relational database management system.

11. A computer based method for transforming a nonrelational multidimensional database, the method comprising:

receiving a dimension identifier that identifies a portion of the nonrelational multidimensional database comprising a nonbalanced tree structured dimension hierarchy with at least two branches, wherein each branch comprises at least a leaf-level dimension member;

traversing the branches of the dimension hierarchy and calculating the depth of each leaf-level dimension member to determine the maximum depth ($D_m$) in the dimension hierarchy; and creating a plurality of database instructions, wherein the instructions cause a transfer of dimension members from the dimension hierarchy into a target database and wherein the instructions create a plurality of rows, each row comprising $D_m$ positions and wherein the instructions insert dimension members into each position in the created rows, wherein at least one dimension member is repeated to fill unpopulated positions in the created rows and wherein the repeated dimension member is the leaf-level dimension member.

12. The computer based method of claim 11, wherein the nonbalanced tree structured dimension hierarchy is an unbalanced hierarchy.

13. The computer based method of claim 11, wherein the nonbalanced tree structured dimension hierarchy is a ragged hierarchy.

* * * * *